United States Patent
Hine et al.

(10) Patent No.: US 10,150,546 B2
(45) Date of Patent: *Dec. 11, 2018

(54) WATERCRAFT EQUIPPED WITH A HYBRID WAVE-POWERED ELECTRICITY GENERATING AND PROPULSION SYSTEM

(71) Applicant: Liquid Robotics, Inc., Sunnyvale, CA (US)

(72) Inventors: Roger G. Hine, Menlo Park, CA (US); Derek L. Hine, Portola Valley, CA (US)

(73) Assignee: LIQUID ROBOTICS, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/635,090

(22) Filed: Jun. 27, 2017

(65) Prior Publication Data

US 2017/0291671 A1    Oct. 12, 2017

Related U.S. Application Data

(63) Continuation of application No. 14/975,330, filed on Dec. 18, 2015, now Pat. No. 9,688,373, which is a
(Continued)

(51) Int. Cl.
*B63H 19/02* (2006.01)
*B63H 1/32* (2006.01)
(Continued)

(52) U.S. Cl.
CPC ............ *B63H 19/02* (2013.01); *B63H 1/32* (2013.01); *B63J 3/02* (2013.01); *B63J 99/00* (2013.01);
(Continued)

(58) Field of Classification Search
CPC .......... B63H 19/02; B63H 19/04; B63H 9/02; B63H 25/08; B63H 1/30; B63H 1/32; B63B 35/44; G05D 1/02; G05D 1/12
(Continued)

(56) References Cited

U.S. PATENT DOCUMENTS

| 986,627 A | 3/1911 | Fisher |
|---|---|---|
| 1,067,113 A | 7/1913 | Heyen |

(Continued)

FOREIGN PATENT DOCUMENTS

| BE | 570555 | 8/1958 |
|---|---|---|
| BE | 570555 | 9/1958 |

(Continued)

OTHER PUBLICATIONS

Australian Examination Report dated Sep. 6, 2017 for Australian Application No. 2016204872.
(Continued)

*Primary Examiner* — Lars A Olson
(74) *Attorney, Agent, or Firm* — Gates & Cooper LLP

(57) ABSTRACT

This disclosure provides improved nautical craft that can travel and navigate on their own. A hybrid vessel is described that converts wave motion to locomotive thrust by mechanical means, and also converts wave motion to electrical power for storage in a battery. The electrical power can then be tapped to provide locomotive power during periods where wave motion is inadequate and during deployment. The electrical power can also be tapped to even out the undulating thrust that is created when locomotion of the vessel is powered by wave motion alone.

20 Claims, 8 Drawing Sheets

Related U.S. Application Data continuation of application No. 14/303,470, filed on Jun. 12, 2014, now Pat. No. 9,353,725, which is a continuation of application No. 13/536,935, filed on Jun. 28, 2012, now Pat. No. 8,808,041, which is a continuation-in-part of application No. PCT/US2012/029718, filed on Mar. 19, 2012, and a continuation-in-part of application No. PCT/US2012/029696, filed on Mar. 19, 2012, and a continuation-in-part of application No. PCT/US2012/029703, filed on Mar. 19, 2012, and a continuation-in-part of application No. 13/424,239, filed on Mar. 19, 2012, now Pat. No. 8,825,241, and a continuation-in-part of application No. 13/424,170, filed on Mar. 19, 2012, now Pat. No. 9,151,267, and a continuation-in-part of application No. 13/424,156, filed on Mar. 19, 2012, now Pat. No. 8,764,498.

(60) Provisional application No. 61/585,229, filed on Jan. 10, 2012, provisional application No. 61/535,116, filed on Sep. 15, 2011, provisional application No. 61/502,279, filed on Jun. 28, 2011.

(51) Int. Cl.
*F03B 13/18* (2006.01)
*F03B 13/20* (2006.01)
*F03B 13/10* (2006.01)
*F03B 13/16* (2006.01)
*B63J 3/02* (2006.01)
*B63J 99/00* (2009.01)
*B63J 3/00* (2006.01)

(52) U.S. Cl.
CPC .............. *F03B 13/10* (2013.01); *F03B 13/16* (2013.01); *F03B 13/1815* (2013.01); *F03B 13/20* (2013.01); *B63J 2754/00* (2013.01); *B63J 2003/003* (2013.01); *B63J 2099/008* (2013.01); *F05B 2240/931* (2013.01); *Y02E 10/38* (2013.01); *Y02T 70/59* (2013.01)

(58) Field of Classification Search
USPC ....................................................... 440/9, 10
See application file for complete search history.

(56) References Cited

U.S. PATENT DOCUMENTS

| | | |
|---|---|---|
| 1,315,267 A | 9/1919 | White |
| 2,170,914 A | 8/1939 | Rudow |
| 2,520,804 A | 8/1950 | Hollar |
| 2,668,512 A | 2/1954 | Klas |
| 2,868,504 A | 1/1959 | Minty |
| 3,012,757 A | 12/1961 | George |
| 3,132,322 A | 5/1964 | Guy |
| 3,297,814 A | 1/1967 | Robert et al. |
| 3,312,186 A | 4/1967 | Olav |
| 3,341,871 A | 9/1967 | Dliveau |
| 3,352,274 A | 11/1967 | Clakins |
| 3,443,020 A | 5/1969 | Loshigian |
| 3,453,981 A | 7/1969 | Gause |
| 3,508,516 A | 4/1970 | Root |
| 3,613,627 A | 10/1971 | Kennedy |
| 3,708,991 A | 1/1973 | Barkley |
| 3,760,441 A | 9/1973 | Handelman |
| 3,828,380 A | 8/1974 | Lebovits et al. |
| 3,845,733 A | 11/1974 | Jackman |
| 3,859,949 A | 1/1975 | Toussaint et al. |
| 3,860,900 A | 1/1975 | Scudder |
| 3,872,819 A | 3/1975 | Pickens |
| 3,889,045 A | 6/1975 | Logsdon |
| 3,928,967 A | 12/1975 | Salter |
| 3,962,982 A | 6/1976 | Marchay et al. |
| 3,978,813 A | 9/1976 | Pickens et al. |
| 4,081,962 A | 4/1978 | Liu et al. |
| 4,134,023 A | 1/1979 | Salter |
| 4,224,707 A | 9/1980 | Mariani |
| 4,225,951 A | 9/1980 | Menin et al. |
| 4,332,571 A | 6/1982 | Jakobsen |
| 4,365,912 A | 12/1982 | Burns |
| 4,371,347 A | 2/1983 | Jakobsen |
| 4,383,725 A | 5/1983 | Bogese et al. |
| 4,389,843 A | 6/1983 | Lamberti |
| 4,462,211 A | 7/1984 | Linderfelt |
| 4,484,838 A | 11/1984 | Stevens |
| 4,598,547 A | 7/1986 | Danihel |
| 4,610,212 A | 9/1986 | Petrovich |
| 4,638,588 A | 1/1987 | Abadie |
| 4,673,363 A | 6/1987 | Hudson et al. |
| 4,684,350 A | 8/1987 | DeLima |
| 4,684,359 A | 8/1987 | Herrington |
| 4,726,314 A | 2/1988 | Ayers |
| 4,763,126 A | 8/1988 | Jawetz |
| 4,842,560 A | 6/1989 | Lee |
| 4,896,620 A | 1/1990 | Jones |
| 4,968,273 A | 11/1990 | Momot |
| 4,981,453 A | 1/1991 | Krishnan et al. |
| 5,050,519 A | 9/1991 | Senften |
| 5,084,630 A | 1/1992 | Azimi |
| 5,147,148 A | 9/1992 | White et al. |
| 5,273,443 A | 12/1993 | Frantz et al. |
| 5,469,801 A | 11/1995 | Payne |
| 5,577,942 A | 11/1996 | Juselis |
| 5,675,116 A | 10/1997 | Hillenbrand |
| 5,678,504 A | 10/1997 | Toplosky et al. |
| 5,690,014 A | 11/1997 | Larkin |
| 5,902,163 A | 5/1999 | Baruzzi et al. |
| 6,097,424 A | 8/2000 | Zernov et al. |
| 6,099,368 A | 8/2000 | Gorshkov |
| 6,194,815 B1 | 2/2001 | Carroll |
| 6,260,501 B1 | 7/2001 | Agnew |
| 6,285,807 B1 | 9/2001 | Walt et al. |
| 6,347,912 B1 | 2/2002 | Thomas |
| 6,408,792 B1 | 6/2002 | Markels |
| 6,561,856 B1 | 5/2003 | Gorshkov |
| 6,665,189 B1 | 12/2003 | Lebo |
| 6,756,695 B2 | 6/2004 | Hibbs et al. |
| 6,814,633 B1 | 11/2004 | Huang |
| 6,883,736 B1 | 4/2005 | Blatt |
| 6,908,229 B2 | 6/2005 | Landrieve et al. |
| 6,980,228 B1 | 12/2005 | Harper |
| 7,213,532 B1 | 5/2007 | Simpson |
| 7,350,475 B2 | 4/2008 | Borgwarth et al. |
| 7,371,136 B2 | 5/2008 | Hine et al. |
| D578,463 S | 10/2008 | Treaud et al. |
| 7,472,866 B2 | 1/2009 | Heaston et al. |
| 7,559,288 B2 | 7/2009 | Amidon |
| 7,641,524 B2 | 1/2010 | Hine et al. |
| 7,955,148 B2 | 6/2011 | Corradini |
| 8,043,133 B2 | 10/2011 | Hine et al. |
| 8,093,736 B2 | 1/2012 | Raftery |
| 8,205,570 B1 | 6/2012 | Tureaud et al. |
| 8,272,831 B2 | 9/2012 | Johnston |
| 8,272,987 B2 | 9/2012 | Tiwari et al. |
| 8,449,341 B2 | 5/2013 | Denise et al. |
| 8,668,534 B2 | 3/2014 | Hine et al. |
| 8,764,498 B2 | 7/2014 | Hine et al. |
| 8,808,041 B2 | 8/2014 | Hine et al. |
| 8,813,669 B2 | 8/2014 | Race et al. |
| 8,825,241 B2 | 9/2014 | Hine et al. |
| 8,912,677 B2 | 12/2014 | Dehlsen et al. |
| 8,944,866 B2 | 2/2015 | Hine |
| 9,051,037 B2 | 6/2015 | Hine et al. |
| 9,353,725 B2 * | 5/2016 | Hine .................... B63H 19/02 |
| 2002/0176747 A1 | 11/2002 | Hanna et al. |
| 2002/0178990 A1 | 12/2002 | McBride et al. |
| 2003/0009286 A1 | 1/2003 | Shibusawa et al. |
| 2003/0056419 A1 | 3/2003 | Squires et al. |
| 2003/0174206 A1 | 9/2003 | Moroz |
| 2003/0193197 A1 | 10/2003 | Hibbs et al. |
| 2003/0220027 A1 | 11/2003 | Gorshkov |

(56) References Cited

U.S. PATENT DOCUMENTS

| | | |
|---|---|---|
| 2004/0102107 A1 | 5/2004 | Gorshkov |
| 2004/0190999 A1 | 9/2004 | Wybro et al. |
| 2004/0217597 A1 | 11/2004 | Carroll et al. |
| 2005/0268834 A1 | 12/2005 | Koda et al. |
| 2006/0213167 A1 | 9/2006 | Koselka |
| 2007/0051292 A1 | 3/2007 | Kilbourn et al. |
| 2007/0173141 A1 | 7/2007 | Hine et al. |
| 2008/0188150 A1 | 8/2008 | Hine et al. |
| 2008/0225643 A1 | 9/2008 | Vosburgh |
| 2008/0294309 A1 | 11/2008 | Kaprielian et al. |
| 2008/0299843 A1 | 12/2008 | Hine et al. |
| 2009/0107388 A1 | 4/2009 | Crowell |
| 2009/0193715 A1 | 8/2009 | Wilcox |
| 2009/0218984 A1 | 9/2009 | Parakulam |
| 2009/0293788 A1 | 12/2009 | McNabb |
| 2009/0308299 A1 | 12/2009 | Luccioni et al. |
| 2009/0311925 A1 | 12/2009 | Hine et al. |
| 2010/0268390 A1 | 10/2010 | Anderson |
| 2011/0059638 A1 | 3/2011 | Sandwith |
| 2011/0067641 A1 | 3/2011 | Kithil |
| 2011/0155039 A1 | 6/2011 | Moore |
| 2011/0174210 A1 | 7/2011 | Craig |
| 2011/0192338 A1 | 8/2011 | Goudeau |
| 2011/0278861 A1 | 11/2011 | Yoon |
| 2012/0006277 A1 | 1/2012 | Troy et al. |
| 2012/0029696 A1 | 2/2012 | Ota |
| 2012/0029718 A1 | 2/2012 | Davis |
| 2012/0069702 A1 | 3/2012 | Muyzert et al. |
| 2012/0094556 A1 | 4/2012 | Hine et al. |
| 2012/0285160 A1 | 11/2012 | Hine et al. |
| 2012/0287751 A1 | 11/2012 | Elvestad |
| 2012/0295499 A1 | 11/2012 | Hine |
| 2013/0102207 A1 | 4/2013 | Hine et al. |
| 2014/0038477 A1 | 2/2014 | Hine et al. |
| 2014/0116311 A1 | 5/2014 | Holemans |
| 2014/0263851 A1 | 9/2014 | Hine et al. |
| 2014/0283726 A1 | 9/2014 | Ong et al. |
| 2014/0284998 A1 | 9/2014 | Brennan et al. |
| 2014/0335747 A1 | 11/2014 | Hine et al. |

FOREIGN PATENT DOCUMENTS

| | | |
|---|---|---|
| CN | 1132757 | 10/1996 |
| CN | 1280936 | 1/2001 |
| CN | 2689229 | 3/2005 |
| CN | 1715136 | 1/2006 |
| CN | 1829629 | 9/2006 |
| CN | 101405179 | 4/2009 |
| CN | 101622173 | 1/2010 |
| CN | 103635384 | 11/2016 |
| DE | 10141805 | 5/2002 |
| DE | 10300599 | 7/2004 |
| DE | 102007053037 | 5/2009 |
| DE | 202008013757 | 4/2010 |
| EP | 1369013 | 12/2003 |
| FR | 1159028 | 6/1958 |
| FR | 2669886 | 6/1992 |
| GB | 2461792 | 1/2010 |
| JP | S55-051697 | 4/1970 |
| JP | S55-152698 | 11/1980 |
| JP | S61-057488 | 3/1986 |
| JP | S63-149289 | 6/1988 |
| JP | S64-050199 | 3/1989 |
| TW | 221588 | 3/1994 |
| TW | 547434 | 7/2003 |
| WO | 1987/004401 | 7/1987 |
| WO | 1994/010029 | 5/1994 |
| WO | 1998/039205 | 9/1998 |
| WO | 1998/046065 | 10/1998 |
| WO | 2001/042992 | 6/2001 |
| WO | 2007087197 | 8/2007 |
| WO | 2008109002 | 9/2008 |
| WO | 2013/077931 | 5/2013 |

OTHER PUBLICATIONS

Extended European Search Report dated Jun. 29, 2017 for European Application No. 16199890.1.
Australian Examination Report dated May 8, 2017 for Australian Application No. 2016204721.
International Preliminary Report on Patentability dated Sep. 17, 2013 for PCT Patent Application No. PCT/US2012/029696 filed on Mar. 19, 2012.
Australian Examination Report dated Feb. 1, 2018 for Australian Patent Application No. 2016204872.
Canadian Office Action dated Apr. 17, 2018 for Canadian Patent Application No. 2,830,437.
European Examination Report dated May 23, 2018 for European Patent Application No. 16199890.1.
International Preliminary Report on Patentability for PCT Application No. PCT/US2012/029703 dated Sep. 26, 2013, 9 pages.
International Preliminary Report on Patentability for PCT Application No. PCT/US2012/029696 dated Sep. 26, 2013, 13 pages.
International Preliminary Report on Patentability for PCT Application No. PCT/US2012/029718 dated Sep. 26, 2013, 13 pages.
Final Office Action for U.S. Appl. No. 13/424,156, dated Dec. 16, 2013, 9 pages.
Notice of Allowance for U.S. Appl. No. 13/424,239, dated Feb. 10, 2014, 11 pages.
International Preliminary Report on Patentability for PCT Application No. PCT/US2012/055797 dated Mar. 27, 2014, 5 pages.
Notice of Allowance for U.S. Appl. No. 13/424,156, dated Mar. 31, 2014, 18 pages.
Office Action for Canadian Patent Application No. 2,679,565 dated Apr. 7, 2014, 3 pages.
Non-Final Office Action for U.S. Appl. No. 13/621,803, dated Apr. 24, 2014, 7 pages.
Non-Final Office Action for U.S. Appl. No. 13/753,377, dated Jun. 24, 2014, 6 pages.
International Search Report and Written Opinion for PCT Application No. PCT/US2014/020853 dated Jul. 1, 2014, 11 pages.
Action for Australian Patent Application No. 2012275286 dated Aug. 22, 2014, 6 pages.
Notice of Allowance for U.S. Appl. No. 13/621,803, dated Sep. 23, 2014, 5 pages.
Office Action for Australian Patent Application No. 2012327253 dated Sep. 23, 2014, 5 pages.
Office Action for Australian Patent Application No. 2012228956 dated Sep. 25, 2014, 3 pages.
International Search Report and Written Opinion for PCT Application No. PCT/US2014/030396 dated Oct. 14, 2014, 17 pages.
Office Action for Australian Patent Application No. 2012228951 dated Nov. 17, 2014, 4 pages.
Notice of Allowance for U.S. Appl. No. 13/753,377, dated Nov. 24, 2014, 7 pages.
Office Action for Australian Patent Application No. 2012228948 dated Nov. 27, 2014, 3 pages.
International Preliminary Report on Patentability for International PCT Application No. PCT/US2012/044729, dated Jan. 16, 2014, 7 pages.
Office Action for Israeli Patent Application No. 215129 dated Dec. 10, 2014, 3 pages.
Notice of Allowance for U.S. Appl. No. 13/753,377, dated Feb. 4, 2015, 7 pages.
Office Action for Chinese Patent Application No. 201280013911.7 dated Jul. 31, 2015, 11 pages.
Non-Final Office Action for U.S. Appl. No. 14/303,470, dated Aug. 4, 2015, 6 pages.
Extended European Search Report dated Nov. 28, 2017 for European Patent Application No. 17167933.5.
LeBlanc, Lester R. "Coherent Path Beamforming Front End for High Performance Acoustic Modems" Florida Atlantic Univ. Boca Raton Dept of Ocean Engineering, 1999 (10 pages).
Green, Dale. "Underwater acoustic communication and modem-based navigation aids." International Conference on Embedded and Ubiquitous Computing. Springer Berlin Heidelberg, 2007.

(56) References Cited

OTHER PUBLICATIONS

U.S. Appl. No. 13/424,170, "Non final office action", dated Oct. 2, 2014, 29 pages.
U.S. Appl. No. 13/424,170, "Notice of Allowance", dated May 27, 2015, 14 pages.
U.S. Appl. No. 13/536,935, "Non-Final Office Action", dated Dec. 10, 2013, 7 pages.
U.S. Appl. No. 13/536,935, "Notice of Allowance," dated May 30, 2014, 7 pages.
U.S. Appl. No. 14/795,646, "Non-final Office Action," dated May 17, 2016, 6 pages.
U.S. Appl. No. 14/795,646. "Notice of Allowance," dated Aug. 9, 2016. 7 pages.
CN200880006903, "Communication from Chinese Patent Office", dated Aug. 24, 2011, 4 pages—English translation.
Department of the Navy, "Persistent Unmanned Autonomous Buoy", ONR/MTS Buoy Workshop 2006, Mar. 13, 2006, 21 pages.
"Persistent Ocean Surveillance Station-Keeping," Defense Advanced Research Projects Agency (DARPA) Strategic Technology Office (STO), 1 page (2005).
"Persistent Ocean Surveillance, Station-Keeping Buoys: Program Overview." Defense Advanced Research Projects Agency (DARPA) Strategic Technology Office (STO), 19 pages (2004).
Ageev, "Application of Solar and Wave Energies for Long-Range Autonomous Underwater Vehicles," Advanced Robotics, 16(1): 43-55 (2002).
Anderson et al., "Towards a Comprehensive Regional Acoustic Study tor Marine Mammal Distribution and Activity Regulation," A Liquid Robotics White Paper, 12 pages (2012).
Clement et al., "Wave Energy in Europe: Current Status and Perspectives," Renewable and Sustainable Energy Reviews 6(5): 405-431 (2002).
Jones et al., "Engineering a Large Sustainable World Fishery," Environmental Conservation, 24(2): 99-104 (1997).
Lenton et al., "The Radiative Forcing Potential of Different Climate Geoengineering Options," Atmospheric Chemistry and Physics Discussions 9: 2559-2608 (2009).
Liquid Robotics brochure, retrieved from http://liquid.com/resources/press-hik.html, 48 pages (2011).
Martin et al., "Iron Deficiency Limits Phytoplankton Growth in the North-East Pacific Subarctic," Nature 331 (6154): 341-343 (1988).
Martin, "Glacial-Integral CO2 Change: The Iron Hypothesis," Paleoceanography 5(1): 1-13 (1990).
Masters, "Liquid Robotics Ocean Robots Embark on World Record Journey Across Pacific Ocean to Foster New Scientific Discoveries," Liquid Robotics press release, 2 pages (2011).
Olson, "Communications Architecture of the Liquid Robotics Wave Glider," 5 pages.
Olson, "Communications Architecture of the Liquid Robotics Wave Glider," presented at the Navigation Guidance and Control of Underwater Vehicles Conference, 5 pages (2012).
Phelps, "Wave-Powered Motor Propels Model Boat," Popular Mechanics 91(8): 182-183 (1949).
Rainville, "Wirewalker: An Autonomous Wave-Powered Vertical Profiler," Journal of Atmospheric and Oceanic Technology 18(6): 1048-1051 (2001).
Shaw, "The Autonaut," The American Monthly Review of Reviews 19, 2 pages (1899).
Solmon et al., "Irreversible Climate Change due to Carbon Dioxide Emission," Proceedings of the National Academy of Sciences 106(6): 1704-1709 (2009).
Sparks, "Persistent UnManned Autonomous Buoy (PUMA)," Office of Naval Research (ONR) and Marine Technology Society (MTS) Buoy Workshop. SeaLandAire Technologies, Inc., 26 pages (2006).
Wilcox et al., "An Autonomous Mobile Platform for Underway Surface Carbon Measurements in Open-Ocean and Coastal Waters," OCEANS 2009, Marine Technology Society (MTS) and Institute of Electrical and Electronics Engineers (IEEE), pp. 1-8 (2009).
International Search Report and Written Opinion for PCT Application No. PCT/US2008/002743 dated Sep. 2, 2008.
Office Action for Chinese Patent Application No. 200880006903 dated Aug. 24, 2011.
Office Action for Japanese Patent Application No. 2008-551327 dated Oct. 18, 2011.
International Search Report and Written Opinion for PCT Application No. PCT/US2012/029703 dated Oct. 17, 2012.
International Search Report and Written Opinion for PCT Application No. PCT/US2012/044729 dated Oct. 17, 2012.
International Search Report and Written Opinion for PCT Applicalion No. PCT/US2012/029718 dated Dec. 21, 2012.
Extended European Search Report and Opinion for EPO Application No. 08726305 dated Jan. 15, 2013.
International Search Report and Written Opinion for PCT Application No. PCT/US2012/029696 dated Apr. 4, 2013.
International Search Report and Written Opinion for PCT Application No. PCT/US2012/055797 dated May 28, 2013.
Office Action for Indian Patent Application No. 6480/DELNP/2008 dated Aug. 7, 2015, 2 pages.
Office Action for European Patent Application No. 12743552.7 dated Aug. 28, 2015, 6 pages.
International Preliminary Report on Patentability for PCT Application No. PCT/US2014/030396 dated Sep. 24, 2015, 12 pages.
International Preliminary Report on Patentability for PCT Application No. PCT/US2014/020853 dated Sep. 24, 2015, 7 pages.
Machine translation of CN 1132757C, 6 pages.
Office Action for Australian Patent Application No. 2008223557 dated Jul. 16, 2012, 5 pages.
Office Action for Australian Patent Application No. 2012211463 dated May 21, 2013, 3 pages.
Final Office Action for U.S. Appl. No. 13/424,170, dated Mar. 20, 2015, 13 pages.
Office Action for European Patent Application No. 12740770.8, dated Mar. 23, 2015, 8 pages.
Non-Final Office Action for U.S. Appl. No. 13/646,737, dated Mar. 15, 2013, 7 pages.
Non-Final Office Action for U.S. Appl. No. 13/424,156, dated Apr. 5, 2013, 10 pages.
Non-Final Office Action for U.S. Appl. No. 13/424,239, dated Apr. 25, 2013, 19 pages.
Chinese Office Action (with English translation) dated Jul. 9, 2018 for Chinese Patent Application No. 201610924505.6.
Canadian Office Action dated Aug. 2, 2018 for Canadian Patent Application No. 2,839,945.

* cited by examiner

WATERCRAFT EQUIPPED WITH A HYBRID WAVE-POWERED ELECTRICITY GENERATING AND PROPULSION SYSTEM

RELATED APPLICATIONS

This application is a continuation of U.S. Ser. No. 14/975,330, filed Dec. 18, 2015, issued as U.S. Pat. No. 9,688,373, which is a continuation of U.S. Ser. No. 14/303,470, filed Jun. 12, 2014, issued as U.S. Pat. No. 9,353,725 on May 31, 2016, which is a continuation of U.S. Ser. No. 13/536,935, filed Jun. 28, 2012, issued as U.S. Pat. No. 8,808,041 on Aug. 19, 2014, through which it claims the priority benefit under 35 U.S.C. § 119(e) of the following U.S. provisional patent applications:

U.S. Provisional Patent Application No. 61/502,279: "Energy-harvesting water vehicle," filed Jun. 28, 2011;

U.S. Provisional Patent Application No. 61/535,116: "Wave-powered vehicles," filed Sep. 15, 2011; and U.S. Provisional Patent Application No. 61/585,229: "Retractable nesting wing racks for wave-powered vehicle," filed Jan. 10, 2012.

U.S. Ser. No. 13/536,935 also claims the priority benefit of the following patent applications, all filed Mar. 19, 2012.

International Patent Application No. PCT/US2012/029718 and U.S. patent application Ser. No. 13/424,239, both entitled "Autonomous wave-powered substance distribution vessels"

International Patent Application No. PCT. US 2012/029696 and U.S. patent application Ser. No. 13/424,170, both entitled "Wave-powered vessels configured for nesting"; and International Patent Application No. PCT/US2012/029703 and U.S. patent application Ser. No. 13/424,156, both entitled "Wave-powered device with one or more tethers."

The aforelisted priority applications, along with U.S. Pat. No. 7,371,136; U.S. Pat. No. 8,043,133; and published applications US 2008/188150 A1; US 2008/299843 A1; and WO/2008/109022 are hereby incorporated herein by reference in their entirety for all purposes.

FIELD OF THE INVENTION

The information disclosed and claimed below relates generally to the fields of vessel motility and power generation. More specifically, it provides watercraft configured for autonomous operation, harvesting both locomotive thrust and electrical power from wave motion.

BACKGROUND OF THE INVENTION

Wave-powered vessels have been described in U.S. Pat. No. 7,371,136; U.S. Pat. No. 8,043,133; and published applications US 2008/188150 A1; US 2008/299843 A1; and WO/2008/109022. Exemplary vessels are manufactured and sold by Liquid Robotics, Inc., Sunnyvale Calif., USA under the brand Wave Glider®.

A previously unrelated field of development covers large stationary systems near shore that use wave motion to generate electrical power for communities on land. U.S. Pat. No. 4,134,023 discusses an apparatus for extracting energy from waves on water. U.S. Pat. No. 6,194,815 provides a piezoelectric rotary electrical energy generator. Published application US 2004/0217597 A1 discusses wave energy converters that use pressure differences. U.S. Pat. No. 3,928,967 is the so-called "Salter's duck" patent, an apparatus and method of extracting wave energy. The status and perspectives of wave energy technology is generally reviewed by Clément et al. in *Renewable and Sustainable Energy Reviews* 6 (5): 405-431, 2002.

SUMMARY OF THE INVENTION

This disclosure provides improved technology for manufacturing and deploying nautical craft that can travel and navigate on their own. A hybrid vessel is described that converts wave motion to locomotive thrust by mechanical means, and also converts wave motion to electrical power for storage in a battery. The electrical power can then be tapped to provide locomotive power during periods where wave motion is inadequate and during deployment. The electrical power can also be tapped to even out the undulating thrust that is created when locomotion of the vessel is powered by wave motion alone.

One aspect of the invention is a wave-powered vessel that has a buoyant vessel body, a mechanical means for converting movement of the vessel body caused by wave motion to horizontal thrust; and an electrical generator for converting movement of the vessel body caused by wave motion to electrical power. Converting wave motion to horizontal thrust may be done in a configuration where an underwater component or swimmer is attached below the vessel body by one or more tethers. In this configuration, the swimmer is weighted to travel in water below the vessel body, and is configured to pull the vessel body by way of the tether. The swimmer has fin surfaces that mechanically provide forward thrust when actuated by rising and falling of the swimmer in the water.

The on-board electrical generator may comprise a means for converting vertical movement of the vessel body caused by wave motion to electrical power, a means for converting horizontal movement of the vessel body through water to electrical power, or both. Shown in the figures is a wave-powered vessel where the electrical generator comprises a piston powered by a swing arm that moves from a horizontal to a vertical position in accordance with the vertical movement of the vessel body. The swing arm is mechanically connected to a swimmer weighted to travel in water below the vessel body. Optionally, the swimmer may be adapted so that motion of the fin surfaces may be dampened to increase electrical power generated by the electrical generator.

Another type of electrical generator comprises a rotatory fin or turbine powered by horizontal movement of the vessel body through the water. In this case, the rotatory fin or turbine is adapted to generate electrical power when rotated in one direction, and to act as a motor providing horizontal thrust to the vessel through the water when rotated in the opposite direction. Further types of electrical generators for harnessing swave powers are detailed later in this disclosure.

Wave-powered vessels according to this invention typically have an electrically powered motor to provide horizontal thrust that powers the vessel through the water. There is also a battery configured to store electrical power generated by the electrical generator and to feed electrical power to the motor to provide propulsion. Optionally, the vessel may have one or more solar panels that also supply electrical power to the battery.

The battery may be used to power arm inboard or outboard electrical motor at any time there is reserve electrical power and it is desirable to increase the sped of the vessel. For example, the battery can power the motor during periods where the motion in each fill wave cycle is inadequate to provide sufficient horizontal thrust to the vessel.

Another aspect of the invention is a wave-powered vessel with locomotive thrust powered alternately by wave motion and by electrical power so as to buffer the trust powered by the wave motion. The electrical power is supplied by a battery, which in turn is charged up by a system that converts wave motion to electrical power, as already outlined.

Another aspect of this invention is a wave-powered vessel configured for deployment from shore. The vessel is kept in compact form, and launched by way of the electric motor to deeper water, whereupon the other components of the vessel are deployed outward and downward. A vessel of this nature typically has a buoyant vessel body, a swimmer configured to retract and be secured against the vessel body, one or more tethers connecting the float to the swimmer, an electrically powered motor configured to propel the vessel through the water; and a battery supplying power to the motor, having sufficient capacity to power the vessel from shore to a location where the swimmer can be deployed. Again, the swimmer is weighted to travel in the water below the vessel body, and is configured with fins to pull the vessel by way of the tether when actuated by vertical movement.

Such a vessel may also have a releasable tow buoy. The vessel body and the tow buoy are configured so that the tow buoy may be releasably housed within the vessel body while on shore, and pulled behind the vessel body after the vessel is deployed.

The vessels of this invention are ideal for use in autonomous operation (without a human attendant on board). The vessel has electronics configured to sense the geographical location of the vessel. There is also a microprocessor programmed to determine the vessels current location, and steer the vessel from its current location towards a target location.

Further aspects of the invention will be evident from the description that follows.

DETAILED DESCRIPTION

This invention provides watercraft that derive both locomotive thrust and electrical energy by wave motion. Detailed illustrations of the invention include a vessel that harvests the power of vertical movement using tethers attached to a spring-loaded suspension device. Wave energy is converted to potential energy in the springs, which is then used to drive an electricity generator. In another example, the vessel has a propeller that can be driven backwards as a generator when in motion so as produce electrical power. Electrical energy obtained by either of these means may be used to power electronics or stored in a battery for later use. The stored energy can be used to provide propulsion on calm days when wave action does not in itself provide enough power for the vessel to travel at the desired speed.

Converting Vertical Wave Power to Locomotive Thrust

One feature of the watercraft of this invention is the ability to use wave motion to drive the vessel from place to place across a body of water.

Figure 1A:
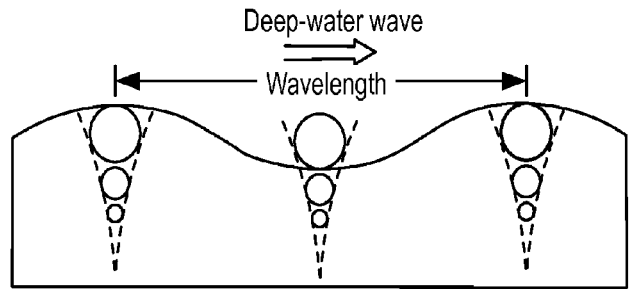
FIG. 1A shows how water moves in roughly circular orbits in waves.

Wave motion can be approximated for many purposes as a linear superposition of roughly sinusoidal waves of varying wavelength, period and direction. As a wave moves horizontally along the surface, the water itself moves in roughly circular orbits of logarithmically decreasing diameter with depth. This is shown in FIG. 1A. The orbit at the surface has a diameter equal to the height of the wave. The orbital diameter at depth is a function of wave length:

$$H_y = H_s e^{-2\pi y/L}$$

where L is the wave length, $H_s$ is the surface wave height and $H_y$ is the orbital diameter at depth y below the surface.

Vessels can be configured to exploit the difference in motion between $H_s$ and $H_y$, and for example, in the following way. A vessel body is positioned at or near the surface, and a submerged swimmer or glider component is positioned at depth y, and connected to the vessel body by one or more tethers. As waves lift and lower the float portion, wings or fins on the submerged portion passively rotate so as to convert the relative motion of the surrounding water into forward thrust. The azimuth of the thrust vector can be directed completely independently of the direction of the waves by a rudder at the back of the glider. The vessel has multiple wings each with a short chord dimension. This minimizes lost motion between the up stroke and the down stroke and enables successful conversion of even very small waves into forward thrust.

Figure 1B:
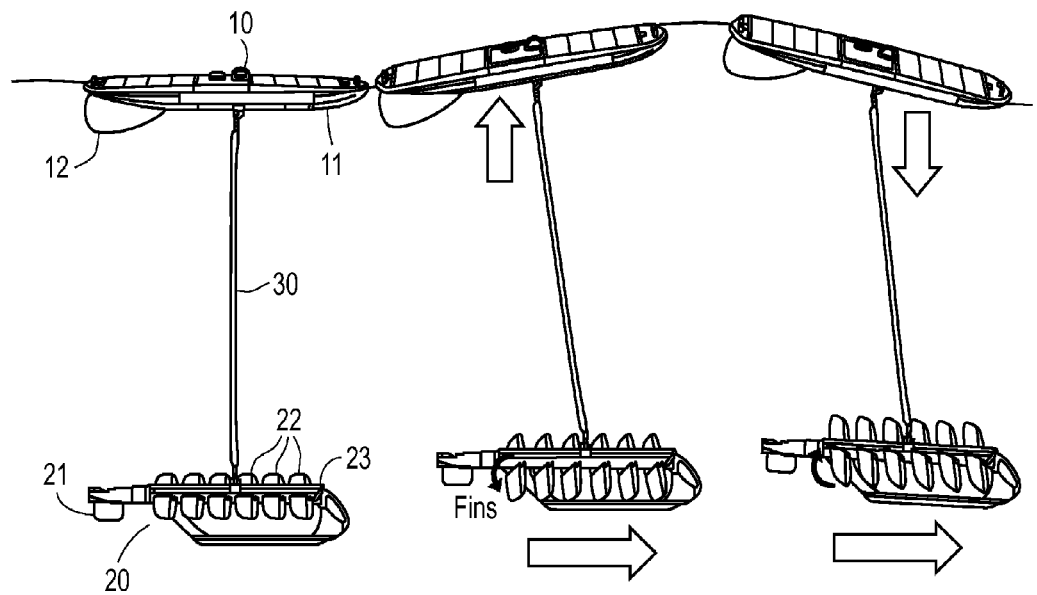
FIG. 1B is a side view of a wave-powered vehicle showing the overall operation.

FIG. 1B is a side view of a wave-powered vehicle that illustrates this principle. The vehicle comprises a float or vessel body 10 resting on the water surface, and a swimmer 20 hanging below, suspended by one or more tethers 30. The float 10 comprises a displacement hull 11 and a fixed keel fin 12. The swimmer comprises a rudder 21 for steering and wings or fins 22 connected to a central beam of the rack 23 so as to permit rotation of the wings around a transverse axis within a constrained range, and provide propulsion.

In still water (shown in the leftmost panel), the submerged swimmer 20 hangs level by way of the tether 30 directly below the float 10. As a wave lifts the float 10 (middle panel), an upwards force is generated on the tether 30, pulling the swimmer 20 upwards through the water. This causers the wings 22 of the swimmer to rotate about a transverse axis were the wings are connected to the rack 23, and assume a downwards sloping position. As the water is forced downward through the swimmer, the downwards sloping wings generate forward thrust, and the swimmer pulls the float forward. After the wave crests (rightmost panel), the float descends into a trough. The swimmer also sinks, since it is heavier than water, keeping tension on the tether. The wings rotate about the transverse axis the other way, assuming an upwards sloping position. As the water is forced upwards through the swimmer, the upwards sloping wings generate forward thrust, and the swimmer again pulls the float forwards.

Thus, the swimmer generates thrust when both ascending and descending, resulting in forward motion of the entire craft.

Autonomous Navigation

A wave-powered vessel may be configured to navigate across a body of water autonomously (without human attendance), and to perform its own power management.

Self-directed navigation is possible when the vessel is equipped with a means of determining the geographical location of the vessel, a means for determining direction, a means for steering the vessel, and a means for operating the steering so that the vessel travels or stays at a target location. The steering means is typically a rudder that turns sideways against the water so as to cause the vessel to spin towards a new heading. Alternatively or in addition, it may be a mechanical arrangement that presses upwards and downwards on opposite sides of the vessel in the manner of an aileron, thereby causing the vessel to roll sideways and attain a new heading. Where the vessel comprises a float and a swimmer connected by a single tether, it is usual to put the steering means on the swimmer providing the locomotive power. In configurations having two or more tethers, a rudder may be placed on the float, the swimmer, or on the float and the swimmer together.

Electronics to sense the geographical location of a vessel can triangulate off a series of reference points. Particularly effective is the global positioning system (GPS), or a similar network of positional transmitting sources. The vessel will also usually have an electronic compass or gyroscope to determine the vessel heading. Positional data about the geographical location and the vessel heading is processed in a decision algorithm or programmed microprocessor, which may then provide navigation instructions. Consequently, the steering means adjusts to head the vessel in accordance with the instructions.

Figure 2:
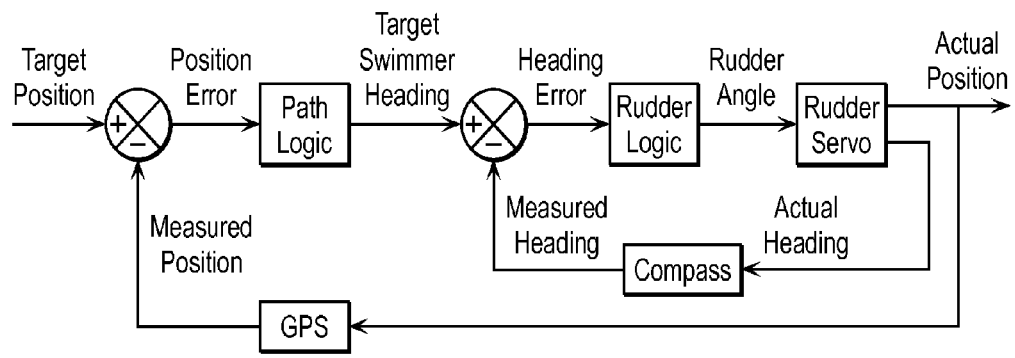
FIG. 2 shows an example of an algorithm for directing a vessel towards or maintaining it at a target position (a geographical location)

FIG. 2 shows an example of an algorithm for directing a vessel towards or maintaining it at a target position (a geographical location). Once the target position is inputted, it is compared with the current location of the vessel inputted from a GPS receiver. The processor calculates the proper heading, and compares it with the heading inputted from the compass. The processor then outputs instructions to the rudder servo to adjust the vessel onto the correct heading. For vessels that are capable of regulating transit speed or locomotive force, the processor may also output instructions to adjust the speed (not shown). Measurement and correction by comparison with GPS and compass data is performed iteratively as the journey continues.

Electrical power is typically needed for the electronics used for self-navigation. This can be supplied by photovoltaic cells located on the deck of the vessel. For low wind resistance, for low visibility, and to reduce the sensitivity to the direction of the sun, it is best if this surface is horizontal. For example, the top deck can be installed with SunPower™ E20 panels each containing 96 Maxeon™ cells. Under standard conditions (irradiance of 1000 Watts/m$^2$, AM 1.5, and cell temperature of 25° C.) six panels produce a total of 1962 Watts.

Converting Wave Movement to Electrical Power

This invention advances the field of wave-powered watercraft by providing two sources of locomotive power. One is a highly efficient mechanical conversion of wave motion directly to locomotive thrust, as described earlier in this disclosure. The second is conversion of wave motion to electrical power, which can be stored and used at a later time. Having the two systems on board provides a number of advantages.

Figure 3:
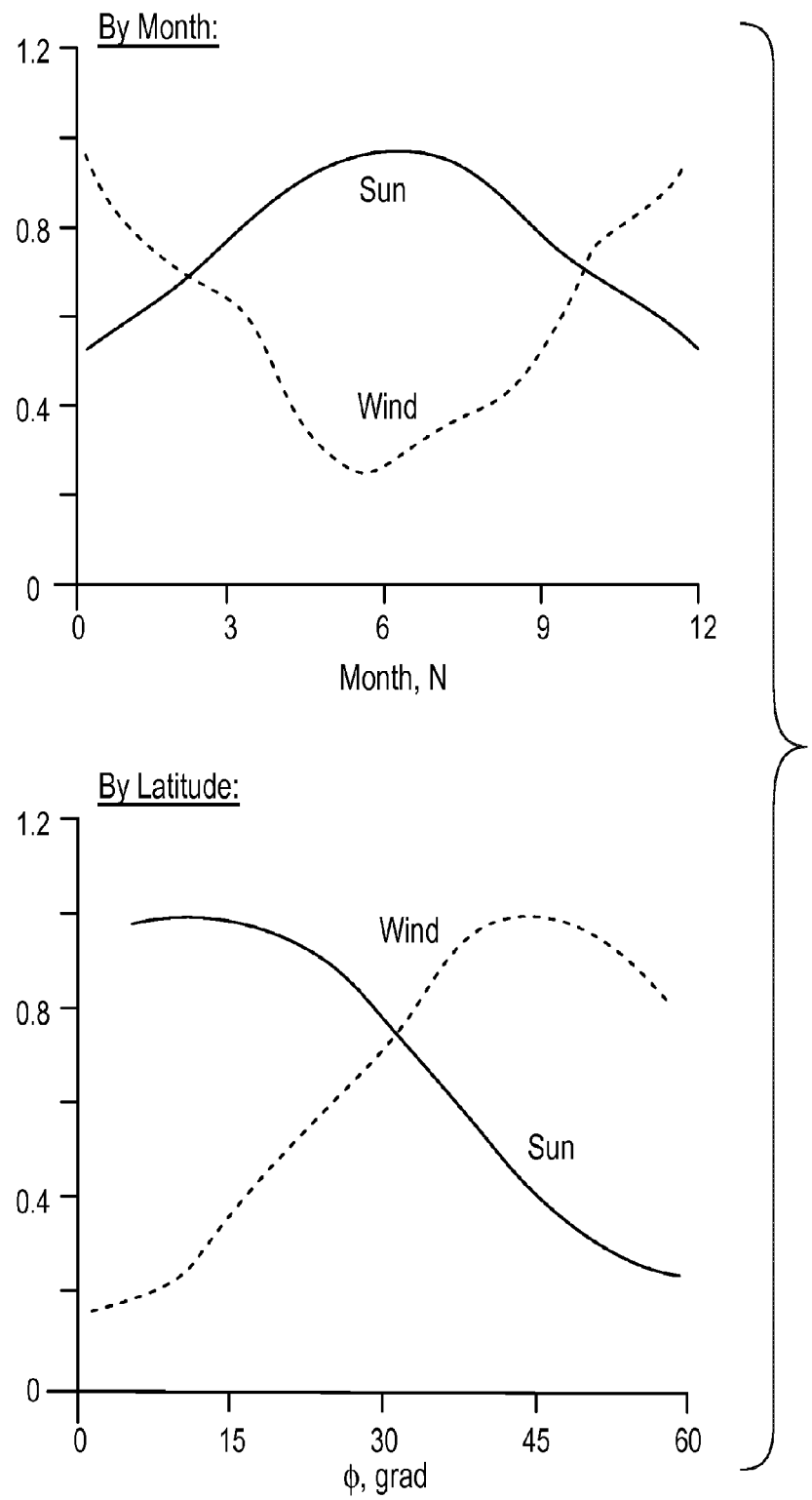
FIG. 3 shows the availability of solar power as a function of the annual cycle.

FIG. 3 shows the availability of solar power as a function of the annual cycle, and as a function of time (adapted from M D Ageev, *Advanced Robotics* 16(1):43-55, 2002). Depending on the size and efficiency of the photovoltaic cells, there may be periods when solar power is inadequate to power the electronics on board. A battery system can be used to buffer and sustain the electronics through diurnal variation, but if the vessel spends long periods in the far north, for example, solar power may be inadequate. On the other hand, using wave motion for locomotive thrust may be insufficiently reliable at or near the equator or in summer months.

The makers of this invention have discovered that when wave motion is high, enough power can be harvested not only to propel the vessel through the water, but also to provide ample electrical power. In fact, enough electrical power can be harvested from the waves not only to power the electronics, but also to create an energy supply that can later be used for locomotion. An electrical generator can be driven by vertical and/or horizontal movement of the vessel caused by the waves. The vessel is configured so that the vertical undulations of the vessel are mechanically coupled to a means of providing horizontal locomotive power to the vessel (such as a fin or wing rack), and are also mechanically coupled to a generator of electrical power.

In vessels equipped in this way, other sources of electrical power (like photovoltaic cells for solar power) are entirely optional—the wave motion mechanically provides power to drive the vessel through the water, and also provides electricity to run electronics and microprocessors aboard.

When electrical power generated from wave motion and/or from solar panels is in excess of immediate needs, it can be stored in an on-board rechargeable battery. The stored electrical power can be used at a later time to power on-board electronics and microprocessors. It can also be used to power an electrically driven propulsion system, such as an electric motor coupled to a propeller or turbine. Thus, on calm days when there is insufficient wave motion to drive the vessel at the desired speed, the battery (optionally in combination with photovoltaic cells) can power the propulsion system. Conversely, the wave generated electrical power can be stored for use during periods that are too dark to rely entirely on solar power—for example, at night—and/or to supplement locomotive thrust.

Figure 4:
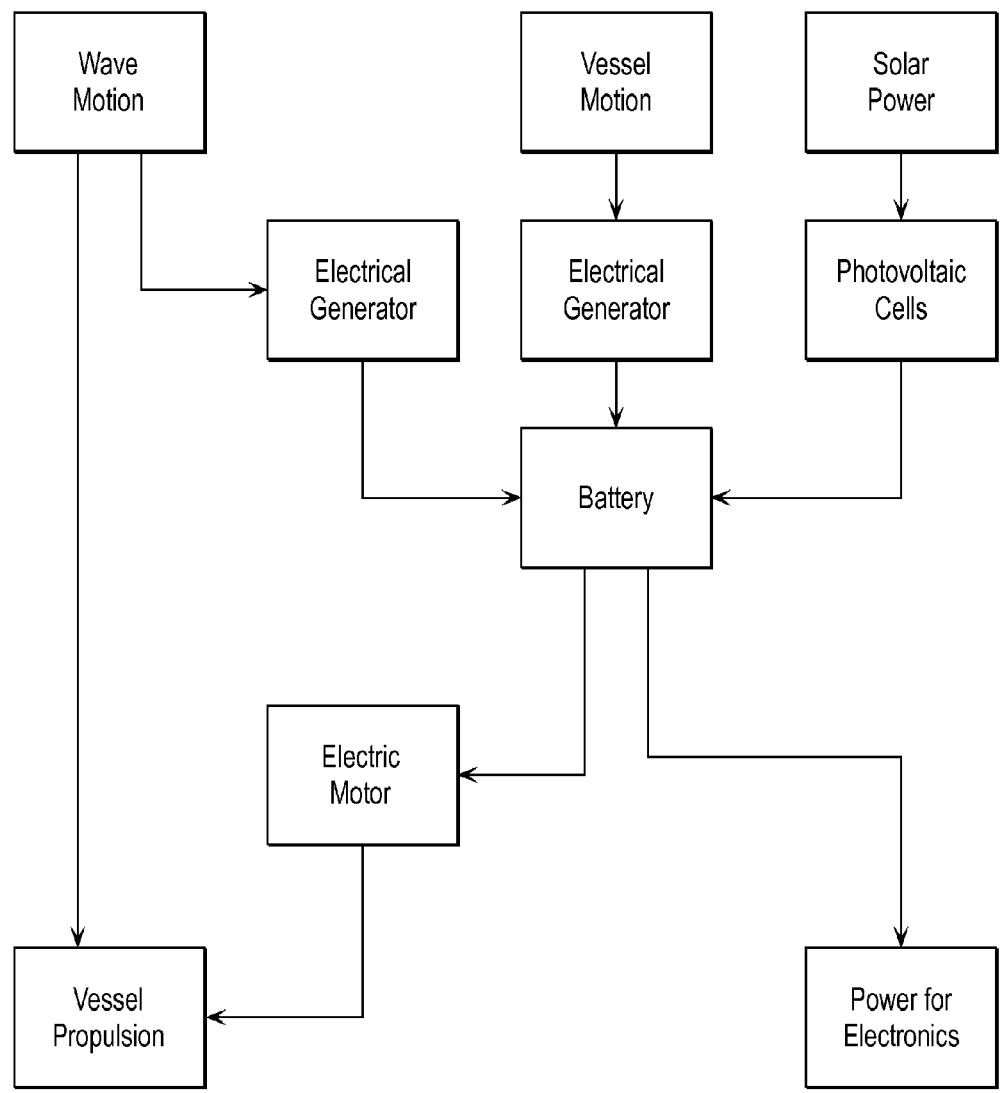
FIG. 4 is a block diagram summarizing how the interaction of power sources can occur.

FIG. 4 is a block diagram summarizing how the interaction of power sources can occur. Sources of power are indicated on the top line; results at the bottom. Wave motion can provide locomotive thrust by mechanical interconnection, such as in a two-part vessel where a floating portion is tethered to a submarine portion. Wave motion can also power a generator adapted for implementation on a vessel, which generates electricity delivered to a rechargeable battery. Vessel motion through the water (a result of propulsion mechanically generated from the wave action) can power an electrical generator of its own, which also feeds the battery. Solar panels (if present) also provide electrical power to a battery. Although they may be separate, typically the battery for any two or three of these power sources are shared by the sources that are present.

Electrical power from the battery supplies on-board electronics, such as navigation equipment, a microprocessor that manages power allocation, and sensors or detectors of various kinds. Electrical power can also be tapped at any time it's available to provide vessel proportion: either to supplement thrust obtained from the wave motion mechanically, or to substitute for mechanical thrust at times when wave motion is insufficient. As explained below, the electric motor may be the same apparatus as the electrical generator powered by vessel motion, run in reverse to provide vessel propulsion.

FIG. 5A, FIG. 5B, FIG. 6A, and FIG. 6B are side views of a vessel that illustrates how wave motion can be converted to electrical power. The vessel has been equipped to harvest wave motion for both locomotive and electrical power. There are two tethers 33a and 33b connecting the vessel body 31 to the swimmer 32, fastened to opposite arms 34a and 34b of a suspension device 37 by way of rotating hinges 35. The aims of the suspension are spring loaded to return to a neutral horizontal configuration in opposite directions along an axis parallel to the vessel's length, pivoting around a central suspension point 36.

Also shown on the vessel body 31 are a propeller 41 powered by an electric motor 42, a rudder 43, and an assembly 44 for receiving and transmitting data and operating instructions that is mounted on the top deck 45. The configuration can be adapted with more tethers attached to more link arms that fold forwards and/or backwards, and are mounted on the vessel body 31 beside, in front, or behind the suspension device 37 shown here.

Figure 5A:
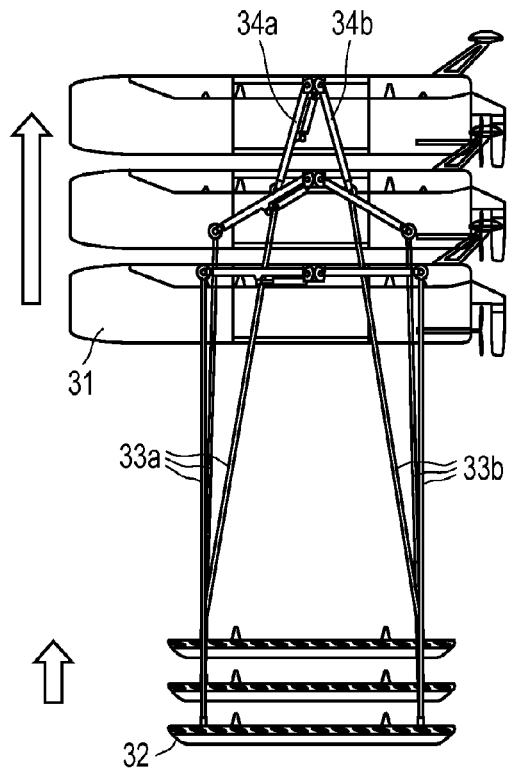
FIG. 5A, FIG. 5B, FIG. 6A, and FIG. 6B are side views of a vessel that illustrates how wave motion can be converted to electrical power.

FIG. 5A superimposes three images showing what happens when the vessel body 31 is lifted by a wave. At the starting position, the suspension device 37 is configured in the neutral position with arms 34a and 34b horizontally positioned in opposite directions. As the wave lifts the vessel body 31, it pulls the swimmer 32 upwards. However, the density of water slows the upward movement of the swimmer 32, thereby pulling the arms 34a and 34b of the suspension device 37 downwards. This loads the spring on each arm with potential energy.

Figure 5B:
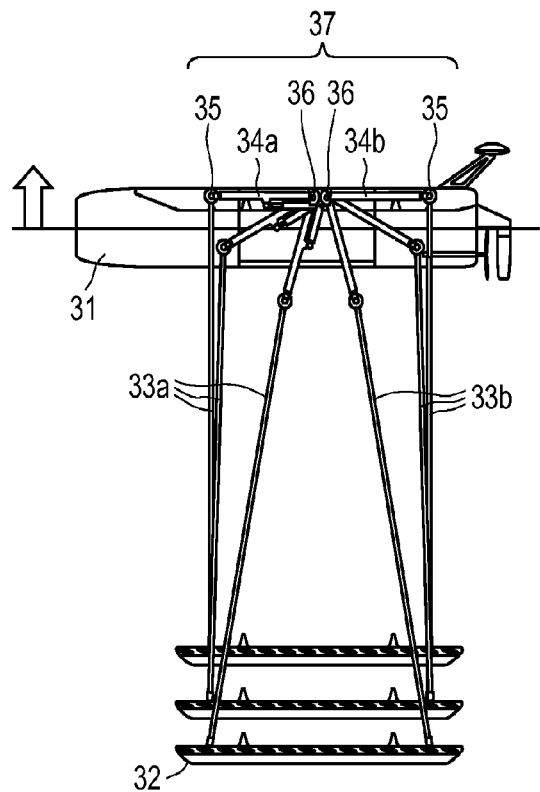

FIG. 5B superimposes three images showing what happens as the vessel approaches the crest of the wave. The upwards motion of the vessel body 31 slows, but the swimmer 32 still travels upwards due to the tension in the arms when they were being pulled downward. As the swimmer 32 continues upwards to a point where the arms 34a and 34b resume the neutral horizontal position, the potential energy in the suspension device 37 is released, and can be captured by a generator means that converts the potential energy in the spring into electrical power.

Figure 6A:
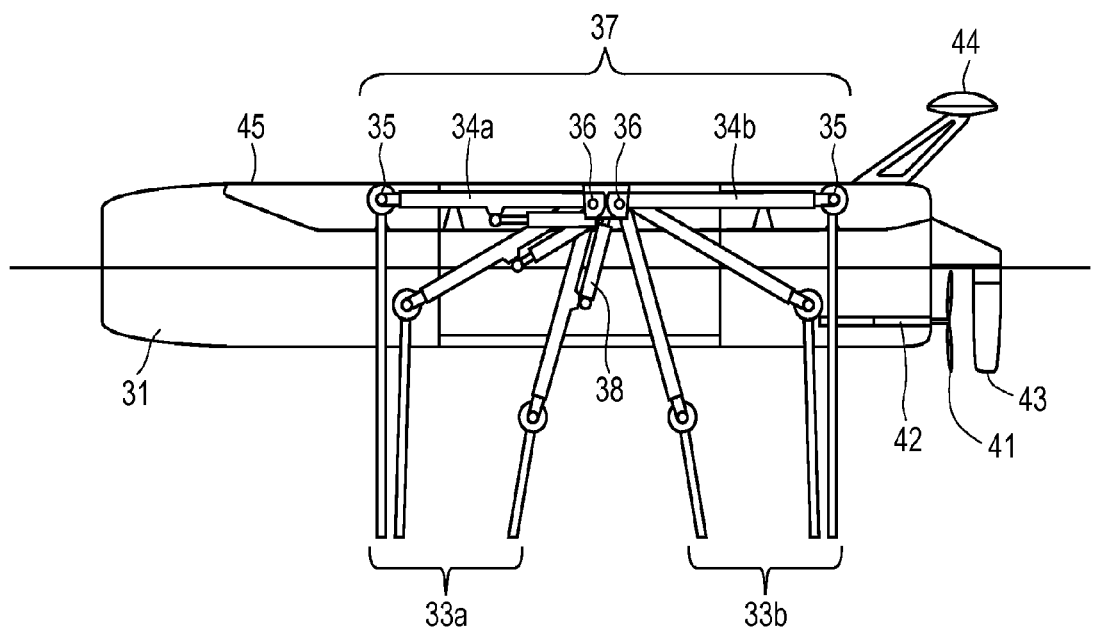

FIG. 6A superimposes three images of the configuration of the suspension device 37 as the potential energy is released. In this example, the two tether winches 33a and 33b pivotally mounted 35 to the ends of link-arms 34a and 34b drive a piston: specifically, a linear hydraulic cylinder 38, which in turn creates pressure to drive a hydraulic turbine generator (not shown). For simplicity the hydraulic cylinder 38 is shown here attached to only one of the link arms 34a, although more typically there is another hydraulic cylinder attached to the other link arm 34b. The link arms 34a and 34b could package nicely in the center span structure without protruding above the deck 45 of the vessel body 31. Optionally, the link aims 44a and 44b can be configured to lock in the neutral horizontal position during times where all of the wave energy is needed for thrust, or when electric generation is not necessary.

Figure 6B:
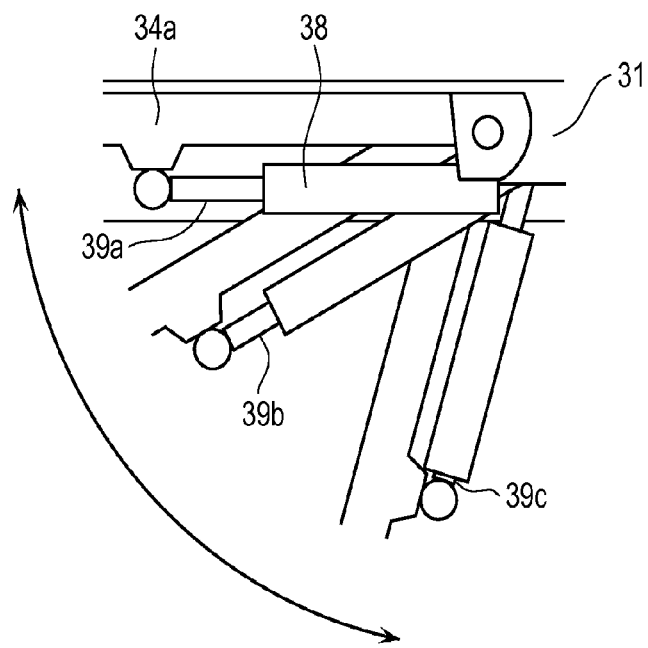

FIG. 6B provides a detail of the action of the hydraulic cylinder 38 during a cycle of movement of the link arm 34a from the neutral horizontal position to the vertical tending spring loaded position as the swimmer is pulled upwards by the vessel body 31 as the wave peaks. When the link arms are in the neutral position, the hydraulic cylinder is extended 39a, and is pushed together 39b into a compressed position 39c as the link arm 34a descends towards the vertical. When the link arm 34a returns to the horizontal position as the wave troughs, the hydraulic cylinder returns to the extended position 39a, completing the cycle.

The arrangement shown in these figures may be adjusted to the user's liking to fit a particular installation. The swing arm system shown in FIG. 5A, FIG. 5B, FIG. 6A, and FIG. 6B may be placed on the swimmer rather than on the float. The link arms are pivotally mounted at the proximal end towards the upper surface of the swimmer, and are spring loaded to assume a horizontal neutral position. The tether is attached to the distal end of the arm, and connects to the float above. Wave motion again stretches the distance between the float and the tether, but in this case the link arms are pulled into an upwards orientation, creating potential energy in the spring that can be converted to electrical power.

Whether mounted on the float or the swimmer, the electrical power generation system may harvest the up and down motion of the link arms by a suitable arrangement that ultimately results in a mechanical force turning conductive wire or bar within a magnetic field, or turning a magnet through a conductor. Included are mechanical arrangements that result directly in rotatory motion (such as a rotating axle), or a back-and-forth action (such as a liquid or gas filled piston) that can be converted mechanically into rotatory motion.

The electrical power generation system shown in FIG. 5A, FIG. 5B, FIG. 6A, and FIG. 6B are provided by way of an example of how such a system may be implemented with high conversion efficiency. The example is not meant to limit practice of the claimed invention except where explicitly indicated. Other systems for harnessing electricity from wave power on a moving vessel may be adapted from stationary on-shore technology now deployed or under development.

Electrical power generating systems may be configured to harness vertical oscillation of the water surface in a wave cycle, or horizontal movement of the wave peaks, or a combination of the two. By way of illustration, a system that harvests electrical power from vertical movement can comprise a tube that floats vertically in the water and tethered to the vessel. The tube's up-and-down bobbing motion is used to pressurize water stored in the tube below the surface. Once the pressure reaches a certain level, the water is released, spinning a turbine and generating electricity. In another illustration, an oscillating water column drives air in and out of a pressure chamber through a Wells turbine. In a third illustration, the power generating system comprises a piston pump secured below the water surface with a float tethered to the piston. Waves cause the float to rise and fall, generating pressurized water, which is then used to drive hydraulic generators.

To harvest horizontal wave movement, the electrical power generating system may comprise one or more large oscillating flaps positioned to catch waves as they go by. The flap flexes backwards and forwards in response to wave motion, which in turn drives pistons that pump seawater at high pressure through a pipe to a hydroelectric generator. Another implementation comprises a series of semi-submerged cylindrical sections linked by hinged joints. As waves pass along the length of the apparatus, the sections move relative to one another. The wave-induced motion of the sections is resisted by hydraulic cylinders, which pump high pressure water or oil through hydraulic motors via smoothing hydraulic accumulators. The hydraulic motors drive electrical generators to produce electrical power.

Converting Horizontal Movement of the Vessel to Electrical Power

Another way of converting wave motion to electrical power is a two-step process. The first step is to use the wave motion to create locomotive thrust, thereby causing the vessel to move through the water. The second step is to harvest the movement of the water about the vessel resulting from the locomotion, and convert it to electrical power.

Figure 7:
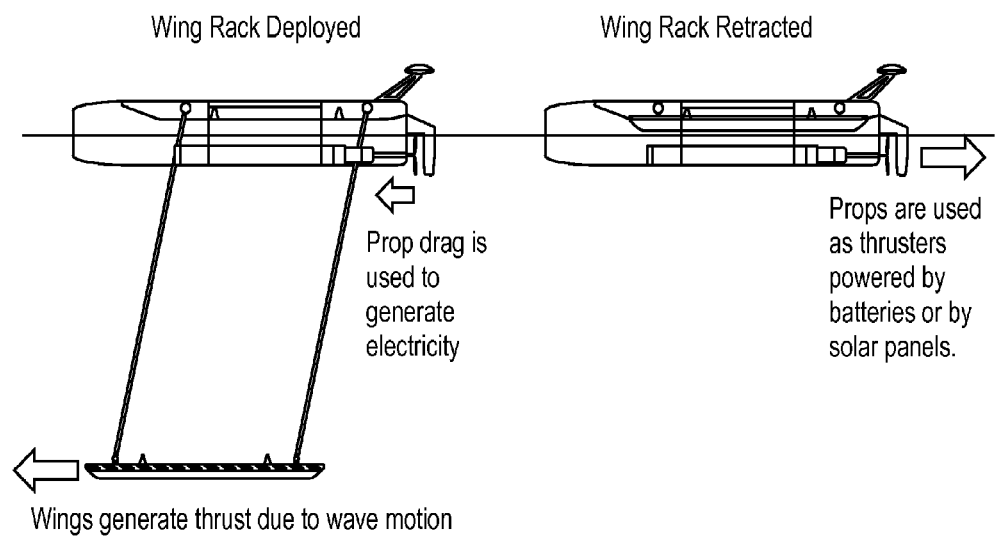
FIG. 7, FIG. 8A, and FIG. 8B show an example of a vessel that uses wave motion to generate both locomotive thrust and electrical power from vessel motion.
Figure 8A:
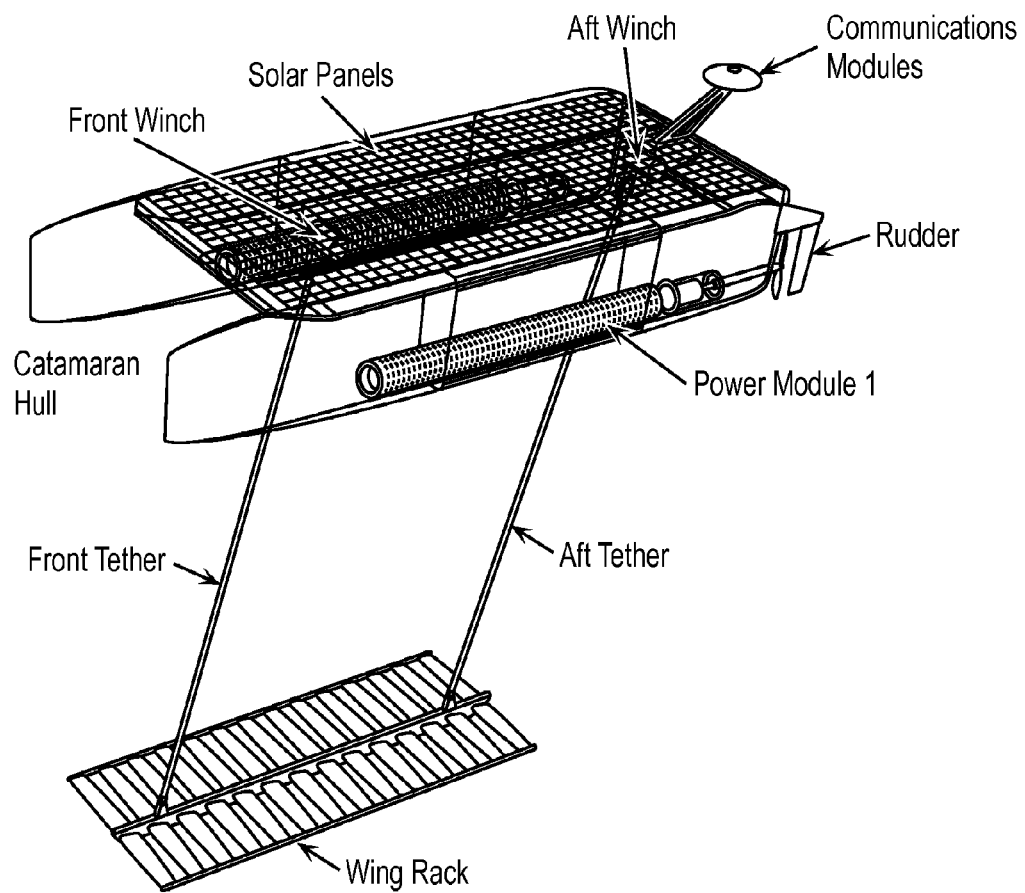
Figure 8B:
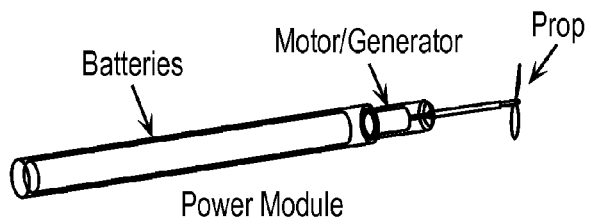

FIG. 7, FIG. 8A, and FIG. 8B show an example of a vessel that uses wave motion to generate both locomotive thrust and electrical power from vessel motion. In this example, the swimmer or wing-rack is tethered to the buoy or vessel body by a foreword and aft tether with a winch for adjusting the length of tether that is deployed. As the buoy moves up and down with the waves, the swimmer rack has wings that translate the vertical movement into transverse locomotive movement. The wing-rack then pulls the vessel body as directed by the rudder under control of the microprocessor.

The electrical system shown here comprises upward facing solar panels, providing an auxiliary source of electrical power. The power module for generating electricity is shown in detail in FIG. 8B. The module comprises rechargeable batteries, a rotating magnet conductor arrangement that plays the role of both motor and generator, and a third component that plays the role of both propeller and turbine. As shown in FIG. 7, when there is an abundance of wave power, the wings on the swimmer generate thrust or locomotive power to move the vessel forward. As the waves power the vessel through the water, the propeller is turned backwards, applying torque to the motor so as to generate electrical power for storage in the battery. When there is an absence of wind power, or when the wing rack is retracted into the vessel body, the batteries or solar panel powers the motor, which turns the propeller so as to provide locomotive power.

The power module is shown in FIG. 8A secured to one side of a catamaran type float. This can be varied to secure the power module for example to the other side, to the middle of a float with a central keel, or to the side rails or middle spine of the swimmer. Two or more power modules can be used, secured for example to both sides of a catamaran type float, or to a float and swimmer together in any combination.

In the example shown, the hull type is a displacement catamaran, which has the advantage of being very efficient below the hull speed, and can be powered up to 3 times faster than the hull speed with minimal wake. It has six 325 watt SunPower panels for almost 2000 watts peak solar power collection. It also has two Tesla-sized lithium ion battery packs housed in cylindrical power modules that are pressure tolerant to 200 m. These packs each have roughly 7000 cells totally 25 kWh of energy. The power modules are 12.75 inches in diameter—the same as a Remus 600 or a BlueFin 12D AUV.

Balancing between Locomotive Thrust and Electrical Power Generation

In some implementations of the invention, the various power harvesting systems on a vessel may be configured to be regulated so as to prioritize delivery of power from wave motion to locomotive thrust or electricity generation in the desired proportion.

The electrical power generating system may be configured to lock out or variably dampen movement of the components that convert the wave motion to rotatory motion, and hence to electricity. For example, the link arm system shown in FIG. 5A, FIG. 5B, FIG. 6A, and FIG. 6B may be designed so that the link arms may be secured by a clamp or other means in the horizontal neutral position. This effectively locks out the power generating system in favor of the wave-powered propulsion system, which may be desirable when the wave motion is not in excess of what is required to propel the vessel at the intended speed, and/or when electrical power is not needed (for example, when the battery is charged to full capacity). In a variation of this system, the damping is variable, so that the proportion of wave motion used for electrical power generation may be precisely adjusted.

Conversely, the wave-powered propulsion system may be configured to lock out or variably dampen movement of the components that convert the wave motion to thrust. For example, the wings or fins shown in FIG. 1B may be designed so that they may be secured in a neutral position. This effectively locks out the propulsion system in favor of the electrical power generating system, which may be desirable when the wave motion is well in excess of what is required to propel the vessel at the intended speed, and/or when electrical power is needed in greater abundance to power on-board electronics and/or recharge the battery. In a variation of this system, the damping is variable, so that proportion of wave motion used for locomotive thrust may be precisely adjusted.

Besides adjusting use of the wave motion between thrust and electricity generation, a variable damping system on the propulsion system may have a further benefit: namely, to regulate speed of the vessel depending on the amount of wave motion currently available, and the desired target location. For example, when it is desired that the vessel stay in position at its current location, the propulsion regular and rudder may be caused assume a direction and speed that exactly compensates for the net effect of underlying current, wind, and horizontal wave force affecting the vessel's position. This effectively secures the vessel at its current GPS location, and saves the vessel from having to travel in circles to maintain its position.

Thus, either the propulsion system, or the electrical power generating system, or both may be configured with a lock out or variable damping arrangement to adjust the priority between the two systems.

Where such regulation systems are installed, they may be controlled by an on-board microprocessor programmed to determine the appropriate priority between locomotion and electrical power generation, and then to regulate the damping or lockout devices on each system accordingly. The microprocessor may be programmed to take into account such factors as vertical wave motion, latitude (determined by GPS), temperature, other weather factors, battery level, distance from the intended target location, amount of available solar power, time of day, payload, sensor data, and operating parameters programmed into or transmitted to the microprocessor.

Alternating Locomotive Thrust from Wave Motion and an Electrical Motor to Buffer Vessel Speed Stored electrical power in the battery can be used to power the electric motor and provide propulsion whenever desired. Besides powering the motor during periods when wave motion is quiescent, it can be used on an ongoing basis to buffer the trust powered by the wave motion.

Figure 9:
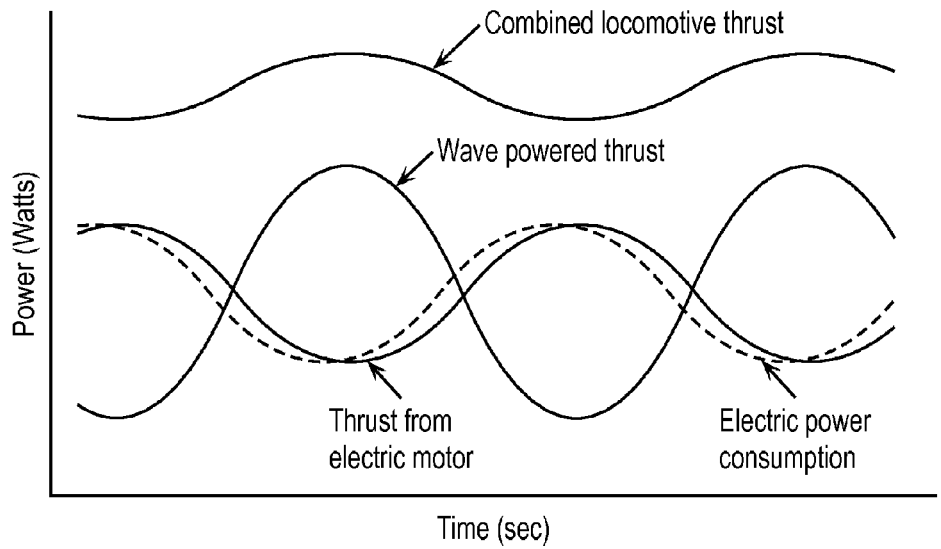
FIG. 9 is a graph of hypothetical data that illustrates how stored electrical power in the battery can be used to power the electric motor and provide propulsion whenever desired.

FIG. 9 is a graph of hypothetical data that illustrates how this might work. Mechanisms that convert wave motion into locomotive power by gradually pressurizing a gas or a liquid may provide fairly uniform thrust. However, other mechanisms result in undulations in thrust that occur once or twice per wave cycle. For example, in a configuration where awing rack is tethered beneath a float (as in FIG. 1B), the mechanism provides forward thrust while the rack is travelling upwards or downwards in the wave cycle. When the wave is peaking or at its nadir, tension on the tethers is fairly constant, and forward thrust is minimal. Thus, in a single wave cycle (as shown in FIG. 9), forward thrust peaks twice.

In many uses of a wave-powered vessel, the undulations are of little consequence. However, there are instances in which a constant speed (and thus relatively constant thrust) is desirable: for example, when using sensors that comprise streamers flowing backwards from the vessel. The undulations in thrust obtained by mechanical conversion can be buffered by powering the electrical motor in an undulating pattern of the same frequency but essentially out of phase. In this manner, thrust from mechanical conversion and thrust from the electric motor alternate, so that the combined locomotive thrust is buffered to a more consistent level. The pattern of power to the electric motor may be controlled by an on board microprocessor programmed to detect the wave cycle, predict the undulations in mechanically derived locomotive thrust, and synchronize the electric motor out of phase to compensate.

Watercraft Configured for Self-Deployment

Another advantage of the hybrid powered vehicles of this invention is that in many instances they may be deployed directly from shore. This saves the trouble and expense of hiring a special vessel and crew to do the deployment in deep water. Instead, the components of the vessel are kept bound together, and the electric motor powers the vessel to deep water for full deployment.

For example, a wave-powered vessel configured for deployment from shore may comprise a buoyant vessel body, a swimmer configured to retract and be secured against the vessel body, one or more tethers connecting the float to the swimmer, an electrically powered motor configured to propel the vessel through the water, and a battery supplying power to the motor, having sufficient capacity to power the vessel from shore to a location where the swimmer can be deployed. The battery is charged up before launch, and the swimmer is kept secured to the float. The electric motor takes the vessel to deep water, and then the tethers are let out to deploy the swimmer to its operative position below the float—either automatically, or by remote control. After deployment, the battery can be recharged on an ongoing basis using the electrical power generating systems aboard the vessel.

Figure 10:
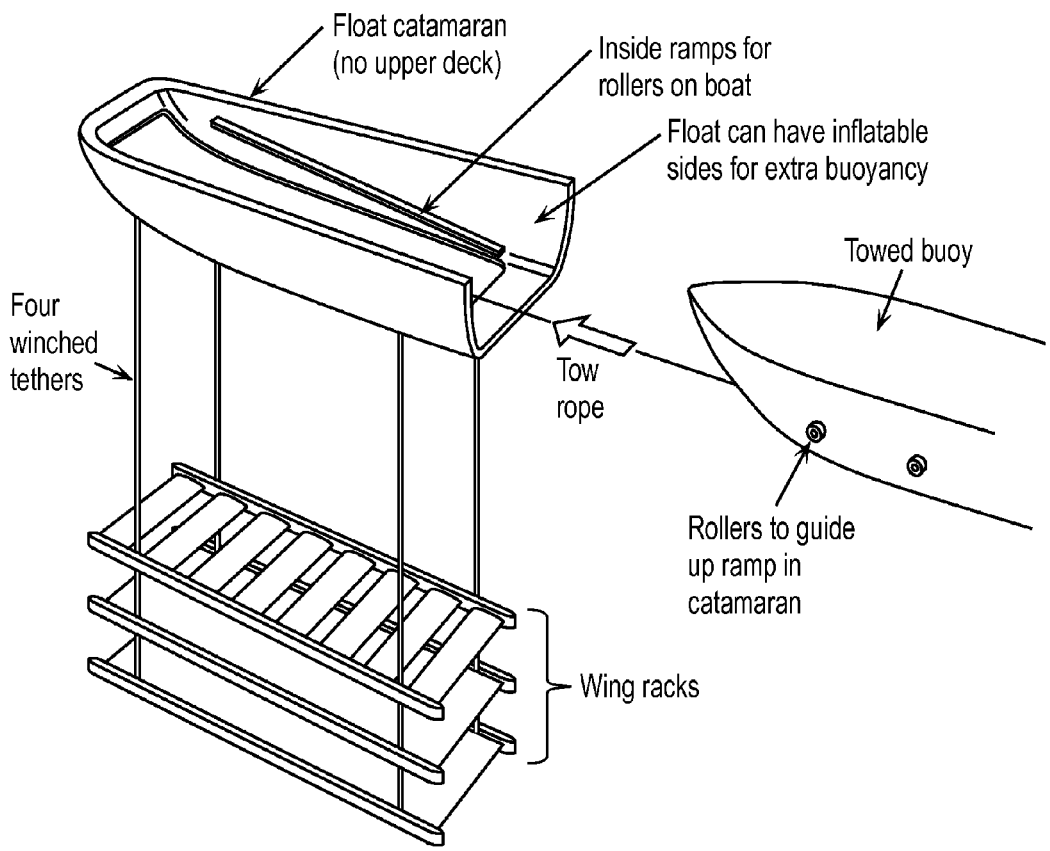
FIG. 10 is a perspective view showing how a vessel body and a tow buoy may be configured so that the tow buoy may be releasably housed within the vessel body while on shore, and pulled behind the vessel body after the vessel is deployed.

FIG. 10 provides a further illustration. Some projects with wave powered vessels require the vessels to take a substantially massive payload. If kept aboard the float or the swimmer, the payload could impair vertical movement, and thus reduce efficiency of the vessel for converting wave motion to thrust and electrical power. Typically, the payload is towed in a container or platform referred to as a "tow buoy" behind the float or the swimmer, either on or below the water surface. However, deploying the vessel and the tow buoy separately from shore is difficult.

The figure shows how the vessel body and the tow buoy may be configured so that the tow buoy may be releasably housed within the vessel body while on shore, and pulled behind the vessel body after the vessel is deployed. The refinements shown include rollers to guide the tow buoy up one or more complementary ramps inside the float. To transport the vessel to the launch site, the tow buoy is positioned securely inside the float, and the tethers connecting the wing racks to the float are retracted so that the wing racks nest securely to the bottom of the float. Following launch, the precharged battery powers the vessel to deep water, whereupon the wing racks are deployed downward, and the tow buoy is deployed out the back of the float so as to be towed by the float without impairing the float's vertical movement due to wave motion.

Use of Wave-Powered Watercraft

The hybrid wave-powered vessels of this invention can be manufactured, sold, and deployed for any worthwhile purpose desired by the user. For example, the vessels can be used to survey and monitor regions of the ocean or other bodies of water, including the chemistry of water and air, weather, and marine life. The vessels can be used to relay signals from sensors under the water or on other vessels to a data processing center. They can be used to monitor activities on shore, and the behavior of other watercraft. They can also be used to distribute substances into the ocean from the vessel body or from a tow buoy.

Sensors and related equipment that may be used include one or more of the following in any suitable combination:
Sensors for gas concentrations in air or water
Heat flux sensors
Meteorological sensors: wind speed & direction, air temperature, solar intensity, rain fall, humidity, pressure
Physical oceanography sensors; wave spectrum & direction, current sensors, CTD profiles
Micro-organism counts and classification through water sampling and vision systems
Fish and wildlife tracking by acoustic tag detection, such as those manufactured by Vemco
FAD structures to provide shade and attract marine life
Acoustic sensors for active or passive detection and classification of marine wildlife. For example, hydrophone for listening to whales, or active sonar for fish counts
Chemical sensors to detect the concentration of a substance being released by the vessel Equipment installed on a vessel of this invention to facilitate data collection may include a means for obtaining sensor data at variable depths. This can be achieved using a winch system to lower and raise sensors mounted on a heavier-than-water platform. Another option is a tow buoy mounted with sensors, with servo-controlled elevator fins to alter the pitch of the tow body, thereby controlling its depth while being pulled. The vessel may also have data storage systems and a microprocessor programmed to process and interpret data from the sensors, either integrated into the location and navigation processing and control system on the vessel, or as a stand-alone microprocessor system.

Watercraft of this invention equipped with sensors and/or payloads have a variety of sociological and commercially important uses. Such uses include fertilizing plankton, feeding fish, sequestering carbon from the atmosphere (PCT/US2012/029718), conducting seismic surveys (US 2012/0069702 A1) or prospecting for new sources of minerals or fuel oil.

GLOSSARY

The terms "vessel", "watercraft", and sea going "vehicle" are used interchangeably in this disclosure and previous disclosures to refer to a nautical craft that can travel across and about any body of water at or near the surface.

A "wave-powered" vessel is a vessel that derives at least a majority of its power for locomotion from motion of the water in relation to the surface. Optionally, the vessel may also derive power from solar energy and other natural sources, and/or man-made sources such as batteries and liquid fuel powered engines. In this context, a "wave" is any upward and downward motion of the surface of a body of water at a point of reference (such as the center of floatation of a vessel).

A "vessel body" or "float" is a component of a vessel that travels on or near the surface of the water. It may have its own source of locomotive power and/or rely on being pulled by a submarine component. It is made buoyant by having a density (including enclosed air pockets and upward opening cavities) that is A "swimmer", "pod", "submarine component", "sub", "glider" or "wing rack" is a component of a vessel that travels below the surface of the water and below the vessel body, to which it provides locomotive power or propulsion. The swimmer is heavier than water, so as to travel downwards through the water to the extent allowed by the tethers and the vessel body and suspension systems to which the tethers are attached above. It is typically equipped with a plurality of "fins" or "wings" that rotate upwards or downwards around an axle transverse to the direction of travel. This disclosure generally refers to vessels having single swimmers or wing racks. However, vessels may be configured with multiple swimmers, typically joined to the same two or more tethers at different depths, each providing locomotive thrust in response to wave action, and optionally configured for nesting when retracted (PCT/US2012/029696). Thus, all the aspects of this invention deriving wave power from a swimmer includes or can be adapted mutatis mutandis to include two, three, or more than three swimmers or wing racks.

An "autonomous" vessel is a vessel that is designed and configured to travel across a body of water without needing a human on board or in constant active control at a remote location. It has a self-contained source of locomotive power. Navigation is controlled, either by a combination of sensors, electronics, and microprocessors aboard or at a remote location and in wireless communication with the vessel. The vessel may also be programmed to manage the ratio of locomotive power derived mechanically from wave action, and from an electric motor. It may also be programmed to control dampening of the action of fins on the swimmer.

A "tow buoy" is a storage container or equipment platform that is towed behind a vessel, attached either the float or the swimmer, and traveling on or below the water surface. The term does not necessarily indicate that the container or platform has a degree of buoyancy.

A "microprocessor" or "computer processor" on a vessel or control unit of the invention inputs data, processes it, and then provides output such as data interpretation or instructions to direct the activity of another apparatus or component. For vessels or units that have different data sets for processing in different ways, the microprocessor for each algorithm may be separate, but more commonly they are a single microprocessor configured and programmed to process each the different data sets with the corresponding algorithms when it is appropriate The wave-powered vessels of this invention may be organized in fleets of two or more that interact with each other and/or with a central control unit. The terms "control unit", "central control unit" and "control center" are used interchangeably to refer to an electronic assembly or combination of devices that receives information about one or more conditions of the water, the weather, or other aspects of the environment at one or more locations, makes decisions about where it is appropriate to distribute fertilizer or another substance from one or more distribution vessels, and sends instructions to the vessels in the fleet accordingly. The control unit may be placed anywhere on shore within range to receive and transmit data and instructions, or it may be aboard one of the vessels in the fleet, optionally integrated with the microcircuitry of that vessel.

For all purposes in the United States of America, each and every publication and patent document cited herein is incorporated herein by reference as if each such publication or document was specifically and individually indicated to be incorporated herein by reference.

While the invention has been described with reference to the specific embodiments, changes can be made and equivalents can be substituted to adapt to a particular context or intended use, thereby achieving benefits of the invention without departing from the scope of what is claimed.

The invention claimed is:

1. A wave powered vessel, comprising:
   a buoyant vessel body;
   a swimmer body, mechanically coupled to the vessel body;
   a propulsion system that is structured to mechanically convert at least a first portion of a movement of the vessel body relative to the swimmer body caused by wave motion into locomotive thrust; and
   a generating system structured to convert at least a second portion of the movement of the vessel body relative to the swimmer body caused by wave motion into electrical power.

2. The wave powered vessel of claim 1, wherein:
   the swimmer body comprises fin surfaces that mechanically provide forward thrust when actuated by the at least the first portion of the movement of the vessel body relative to the swimmer body.

3. The wave powered vessel of claim 2, wherein:
   the fin surfaces are variably damped, the variable damping selected to control a proportion of the at least the first portion movement of the vessel body relative to the swimmer body converted to the locomotive thrust to the at least the second portion of the movement of the vessel body relative to the swimmer body converted to electrical power.

4. The wave powered vessel of claim 3, wherein the proportion of the at least the first portion movement of the vessel body relative to the swimmer body converted to the locomotive thrust to the at least the second portion of the movement of the vessel body relative to the swimmer body converted to electrical power is controlled to regulate a speed of the vessel.

5. The wave powered vessel of claim 4, further comprising a microprocessor, the microprocessor programmed to:
   predict undulations in the locomotive thrust; and
   control the proportion of the at least the first portion movement of the vessel body relative to the swimmer body converted to the locomotive thrust to the at least the second portion of the movement of the vessel body relative to the swimmer body converted to electrical power according to the predicted undulations in locomotive thrust to regulate the speed of the vessel.

6. The wave powered vessel of claim 4, wherein the proportion of the at least the first portion movement of the vessel body relative to the swimmer body converted to the locomotive thrust to the at least the second portion of the movement of the vessel body relative to the swimmer body converted to electrical power is controlled to retain the vessel at a position.

7. The wave powered vessel of claim 1, wherein:
   the propulsion system comprises propulsion system mechanical components;

the propulsion system mechanical components are variably dampened to control a proportion of the at least the first portion movement of the vessel body relative to the swimmer body converted to the locomotive thrust to the at least the second portion of the movement of the vessel body relative to the swimmer body converted to electrical power;

the generating system comprises generating system mechanical components; and the generating system mechanical components are variably dampened to control the proportion of the at least the first portion movement of the vessel body relative to the swimmer body converted to the locomotive thrust to the at least the second portion of the movement of the vessel body relative to the swimmer body converted to electrical power.

8. The wave powered vessel of claim 7, wherein:

at least one of the propulsion system mechanical components and the generating system mechanical components are variably dampened to regulate a speed of the vessel.

9. The wave powered vessel of claim 8, wherein:

at least one of the propulsion system mechanical components and the generating system mechanical components are variably dampened to retain the vessel at a position.

10. A method of powering a vessel comprising buoyant vessel body mechanically coupled to a swimmer body, comprising:

mechanically converting, with a propulsion system, at least a first portion a movement of the vessel body relative to the swimmer body caused by wave motion into locomotive thrust; and mechanically converting, with a generating system, at least a second portion of the movement of the vessel body relative to the swimmer body caused by wave motion into electrical power.

11. The method of claim 10, wherein mechanically converting, with a propulsion system, at least a first portion a movement of the vessel body relative to the swimmer body caused by wave motion into locomotive thrust comprises:

mechanically providing forward thrust via fin surfaces actuated by the at least the first portion of the movement of the vessel body relative to the swimmer body.

12. The method of claim 11, wherein:

the fin surfaces are variably damped, the variable damping selected to control a proportion of the at least the first portion of the movement of the vessel body relative to the swimmer body converted to the locomotive thrust to the at least the second portion of the movement of the vessel body relative to the swimmer body converted to electrical power.

13. The method of claim 12, wherein the proportion of the at least the first portion of the movement of the vessel body relative to the swimmer body converted to the locomotive thrust to the at least the second portion of the movement of the vessel body relative to the swimmer body converted to electrical power is controlled to regulate a speed of the vessel.

14. The method of claim 13, further comprising:
predicting undulations in the locomotive thrust; and
controlling the proportion of the at least the first portion of the movement of the vessel body relative to the swimmer body converted to the locomotive thrust to the at least the second portion of the movement of the vessel body relative to the swimmer body converted to electrical power according to the predicted undulations in locomotive thrust to regulate the speed of the vessel.

15. The method of claim 13, wherein:

the proportion of the at least the first portion of the movement of the vessel body relative to the swimmer body converted to the locomotive thrust to the at least the second portion of the movement of the vessel body relative to the swimmer body converted to electrical power is controlled to retain the vessel at a position.

16. The method of claim 10, wherein:

the propulsion system comprises propulsion system mechanical components;

the generating system comprises generating system mechanical components;

the method further comprises:

variably damping the propulsion system mechanical components to control a proportion of the at least the first portion of the movement of the vessel body relative to the swimmer body converted to the locomotive thrust to the at least the second portion of the movement of the vessel body relative to the swimmer body converted to electrical power; and variably damping the generating system mechanical components to control the proportion of the at least the first portion of the movement of the vessel body relative to the swimmer body converted to the locomotive thrust to the at least the second portion of the movement of the vessel body relative to the swimmer body converted to electrical power.

17. The method of claim 16, wherein:

at least one of the propulsion system mechanical components and the generating system mechanical components are variably dampened to regulate a speed of the vessel.

18. The method of claim 17, wherein:

at least one of the propulsion system mechanical components and the generating system mechanical components are variably dampened to retain the vessel at a position.

19. A wave powered vessel, comprising:

a buoyant vessel body;

a swimmer body, mechanically coupled to the vessel body;

a propulsion system that is structured to mechanically convert at least a first portion of a movement of the vessel body relative to the swimmer body caused by wave motion into locomotive thrust;

a generating system structured to convert at least a second portion of the movement of the vessel body relative to the swimmer body caused by wave motion into electrical power; and a microprocessor, the microprocessor programmed to control a proportion of the at least the first portion movement of the vessel body relative to the swimmer body converted to the locomotive thrust to the at least the second portion of the movement of the vessel body relative to the swimmer body converted to electrical power.

20. The wave powered vessel of claim 19, wherein:

the microprocessor is further programmed to predict undulations in the locomotive thrust; and control the proportion of the at least the first portion movement of the vessel body relative to the swimmer body converted to the locomotive thrust to the at least the second portion of the movement of the vessel body relative to the swimmer body converted to electrical power according to the predicted undulations in locomotive thrust to regulate a speed of the vessel.

* * * * *